United States Patent
Colgrove et al.

(10) Patent No.: US 7,996,717 B1
(45) Date of Patent: Aug. 9, 2011

(54) COMPRESSION OF TEMPORAL DIMENSION IN A TEMPORAL STORAGE DEVICE

(75) Inventors: John A. Colgrove, Los Altos, CA (US); Anand A. Kekre, Pune (IN); Ankur P. Panchbudhe, Nagpur (IN)

(73) Assignee: Symantec Operating Corporation, Mountain View, CA (US)

( * ) Notice: Subject to any disclaimer, the term of this patent is extended or adjusted under 35 U.S.C. 154(b) by 317 days.

(21) Appl. No.: 12/405,790

(22) Filed: Mar. 17, 2009

Related U.S. Application Data (63) Continuation of application No. 11/053,070, filed on Feb. 8, 2005, now Pat. No. 7,506,202.

(51) Int. Cl.
*G06F 11/00* (2006.01)

(52) U.S. Cl. ............. 714/19; 714/20; 707/649; 707/662

(58) Field of Classification Search .................. None
See application file for complete search history.

(56) References Cited

U.S. PATENT DOCUMENTS

| | | | |
|---|---|---|---|
| 6,353,836 B1 | 3/2002 | Bamford et al. | 707/203 |
| 6,553,392 B1 | 4/2003 | Mosher et al. | 707/204 |
| 6,732,125 B1 | 5/2004 | Autrey et al. | 707/204 |
| 7,246,258 B2 | 7/2007 | Chen et al. | 714/6 |
| 7,266,654 B2 | 9/2007 | Nakano et al. | 711/162 |
| 7,506,202 B1 * | 3/2009 | Colgrove et al. | 714/20 |
| 2004/0139127 A1 | 7/2004 | Pofelski | 707/203 |
| 2004/0267836 A1 | 12/2004 | Armangau et al. | 707/203 |
| 2006/0085679 A1 | 4/2006 | Neary et al. | 714/13 |
| 2006/0173930 A1 | 8/2006 | Soini et al. | 707/204 |
| 2007/0198605 A1 | 8/2007 | Saika | 707/202 |

* cited by examiner

*Primary Examiner* — Marc Duncan
(74) *Attorney, Agent, or Firm* — Campbell Stephenson LLP (57) ABSTRACT

A method, apparatus, and computer program product for setting and implementing a policy to compress the history of data on a temporal volume is described.

20 Claims, 7 Drawing Sheets

| | A | B | C | D | E | F | G |
|---|---|---|---|---|---|---|---|
| $CP_0$ | A | B | C | D | E | F | G |
| $CP_1$ | | B" | | | E' | | |
| $CP_2$ | A' | | C' | D' | E" | | |
| $CP_3$ | | | C" | | $E^{IV}$ | F' | |
| $CP_4$ | A" | | C'" | D" | $E^V$ | | |
| $CP_5$ | A'" | B'" | | | | | |
| $CP_6$ | | | | $D^{IV}$ | $E^{VI}$ | | |
| $CP_7$ | $A^{IV}$ | | | $D^V$ | $E^{VII}$ | | |
| $CP_8$ | | | | $D^{VI}$ | | F" | |
| $CP_9$ | $A^V$ | | $C^{IV}$ | | $E^{VIII}$ | F'" | |
| $CP_{10}$ | | | $C^V$ | | | $F^{IV}$ | |
| $CP_{11}$ | $A^{VI}$ | | | | | | |
| $CP_{12}$ | | | | $D^{VII}$ | | | |

| | A | B | C | D | E | F | G |
|---|---|---|---|---|---|---|---|
| $CP_0$ | A | B | C | D | E | F | G |
| $<CP_1,CP_4>$ | A" | B" | C'" | D" | $E^V$ | F' | |
| $<CP_5,CP_8>$ | $A^{IV}$ | B'" | | $D^{VI}$ | $E^{VII}$ | F" | |
| $<CP_9,CP_{10}>$ | $A^V$ | | $C^V$ | | $E^{VIII}$ | $F^{IV}$ | |
| $CP_{11}$ | $A^{VI}$ | | | | | | |
| $CP_{12}$ | | | | $D^{VII}$ | | | |

COMPRESSION OF TEMPORAL DIMENSION IN A TEMPORAL STORAGE DEVICE

CROSS-REFERENCE TO RELATED APPLICATIONS

This application is a continuation of U.S. patent application Ser. No. 11/053,070, entitled "Compression of Temporal Dimension in a Temporal Storage Device", filed Feb. 8, 2005, now U.S. Pat. No. 7,506,202 and naming John Colgrove, Anand A. Kekre, and Ankur Panchbudhe as inventors. This application is assigned to Symantec Operating Corporation, the assignee of the present invention, and is hereby incorporated by reference, in its entirety and for all purposes, as if completely and fully set forth herein.

FIELD OF THE INVENTION

The field of this invention relates to data storage systems. Specifically, a method, system, and apparatus is presented to compress the time dimension of a temporal storage device, thus reducing the amount of data retained by such a device.

BACKGROUND OF THE INVENTION

The ready ability for a business to store, process and to transmit data is a facet of operations that a business relies upon to conduct its day-to-day activities. For businesses that increasingly depend upon data for their operations, an inability to store, process, or transmit data can hurt a business' reputation and bottom line. Businesses are therefore taking measures to improve their ability to store, process, transmit, and restore data, and to more efficiently share the resources that enable these operations.

The ever-increasing reliance on data and the computing systems that produce, process, distribute, and maintain data in its myriad forms continues to put great demands on techniques for data protection. Simple systems providing periodic backups of data have given way to more complex and sophisticated data protection schemes that take into consideration a variety of factors, including a wide variety of computing devices and platforms, numerous different types of data that must be protected, speed with which data protection operations must be executed, and flexibility demanded by today's users.

In many cases, disaster recovery involves restoring data to a point in time when the desired data was in a known and valid state. Backup schemes to ensure recoverability of data at times in the past are varied. Such schemes have traditionally included periodic full backups followed by a series of differential backups performed at intervals between the full backups. In such a manner, a data set can be restored at least to a point in time of a differential backup. Such an approach can be resource intensive as permanent records of the full and differential backups must be kept in order to ensure that one can restore a data set to a state at a particular point in time, especially to point in the distant past. Further, the process of restoring a data volume from a full and a series of differential backups can be time and resource consuming, leading to delays in making the data available to the users.

One approach to providing a less resource-intensive capacity to restore a data set to a particular prior point in time is temporal storage, also known as time-indexed storage and time-addressable storage. Temporal storage can be implemented by associating a temporal volume with a particular data set. A temporal volume maintains non-present data in addition to the data in its present state. A temporal volume maintains the history of data stored on it, thus providing a way for an application to retrieve a copy of the data at any time in the past.

Temporal volumes provide an infrastructure for maintaining and accessing temporal data. Temporal volumes can be used by applications at all levels, including file systems and database management systems. In addition, temporal volumes can also be used as building blocks for data archival, versioning, replication, and backup through integration with file system and backup products. Temporal volumes preserve temporal content so that the content can be used at a later point in time for snapshots, incremental backups, replication, restoring corrupted volumes or deleted files, etc.

In a normal storage volume, when data changes, a data block is changed in situ. In a temporal volume, when a block of data is changed, the existing block can be preserved, and a new data block can be written to a separate location and associated with a time stamp; metadata in the temporal volume is also manipulated to provide a link to the new data block. Old versions of a data block are maintained even when the data block is deleted. This achieves the effect of maintaining copies of one or more states of the data in the past. This process can also be thought of as continuous versioning of the data on the disk volume, and retaining snapshots of the volume whenever it changes. Another temporal storage implementation provides the same effect of maintaining data at points in time by preserving an existing block along with some record of the time of change, and then writing the new data block to the device.

There are many possible embodiments for temporal volumes. In one embodiment, the contents of a temporal volume can be preserved using an indexing system or structure. An indexing structure can be formed using a space-optimized persistent store by allocating the storage over a cache object. A cache object is a logical storage object that gives an illusion of infinite space, while using only limited actual storage space. The cache object accomplishes this by provisioning storage on an as-needed basis.

In another embodiment, the temporal volume can be divided into one or more regions. A region may be anywhere from one physical block of the disk to regions of kilobytes, megabytes, gigabytes, etc. Each region can have a time stamp associated with it. Applications accessing the temporal volume can specify the time stamps associated with the regions. Alternatively, a time stamp may be specified by an application or the temporal volume manager when data is written to the temporal volume.

Ideally, a temporal volume stores every change that happens to every block of data. But practically, users may be interested in storing only certain changes or images of the volume at only certain points in time or after a defined event. These points at which data is stored on a temporal volume are "checkpoints" of the data. As discussed below, checkpoints can be linked, for example, to the passage of time, the number of changes to associated data, or to a quantity of changes in a section of a volume. Defining the regularity and system of checkpointing can be done by setting a temporal granularity attribute, which is a policy describing when the changes to data on a temporal volume should be stored. The policy will define when a new checkpoint or image of the data on the volume is created internally. Temporal granularity of data can be supplied and maintained in a temporal volume in several ways, including, but not limited to: zero granularity (also known as continuous checkpointing), periodic granularity (also known as regular checkpointing), fixed change granularity, N-change granularity, and application controlled checkpointing.

Zero granularity, or continuous checkpointing, is the ideal case mentioned above. A temporal volume configured with zero granularity maintains every change to the data. That is, whenever a data block is modified, a checkpoint reflecting the modification to the data block is recorded and associated with a time stamp reflecting the time of change. In general, the time stamp is distinct from the concept of a checkpoint. A checkpoint can be thought of as an index point at which modified data is recorded, while a time stamp reflects the time of the data recordation. When a data block is recorded at a checkpoint, the previous version of the data block is also maintained.

Periodic granularity, or regular checkpointing, represents a scenario in which changes to data are stored only at periodic intervals in time. For example, if the granularity is set to two minutes, then an image of modified data will be retained at a checkpoint only every two minutes.

Figure 1:
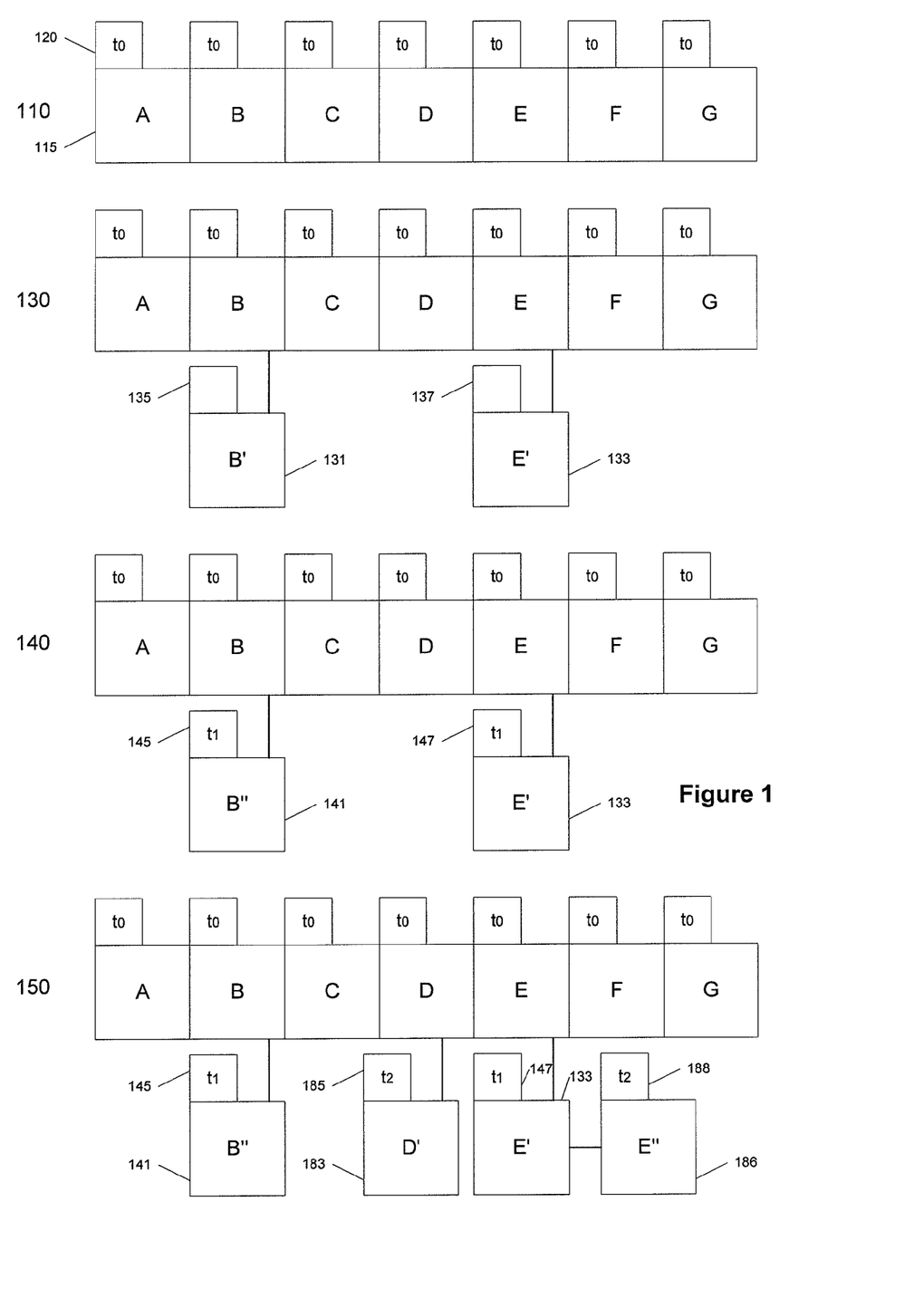
FIG. 1 illustrates an implementation of temporal data storage using a periodic granularity policy.

FIG. 1 illustrates an implementation of temporal data storage using periodic granularity. At time $t_0$, a set of data blocks A-G is recorded (110). This can be considered an initial checkpoint for the data, $CP_0$. Each block of data (115) is associated with a time stamp $t_0$ (120). Subsequent to time $t_0$, data in blocks B and E is modified with data B' (131) and E' (133), respectively. The new versions of the data blocks are recorded, but with an empty time stamp (135, 137). The chosen periodicity for maintaining data in this scenario is p; thus, the checkpoint at time $t_1 = t_0 + p$ is illustrated at 140 and can be identified as $CP_1$. At $CP_1$, time stamp $t_1$ is associated with all data blocks that have been modified since the previous checkpoint $CP_0$. The illustrated example shows that B" (141) is associated with time stamp $t_1$ (145) and E' (143) is also associated with time stamp $t_1$ (147). It should be noted that the further modification B" (141) has replaced B' (131). The temporal volume is configured such that for every change in data between $CP_0$ and $CP_1$, any block having an empty time stamp, such as 131, will be overwritten. A further example of periodic granularity checkpointing is shown at 150, reflecting the state of data at a checkpoint $CP_2$ associated with time stamp $t_2$. No changes occurred to B" between $CP_1$ and $CP_2$ and therefore it is still associated with time stamp $t_1$. Block D was modified between $CP_1$ and $CP_2$ to D' (183), and the modification is associated with time stamp $t_2$ (185). Block E has undergone a further change to E" (186). The modified block is associated with time stamp $t_2$ (188). The condition of block E (E') at $CP_1$ continues to be retained (133).

In a temporal volume with an N-change temporal granularity policy, changes to a block of data or a set of data will be retained at a checkpoint only when a set number of modifications to the data have been made.

Figure 2:
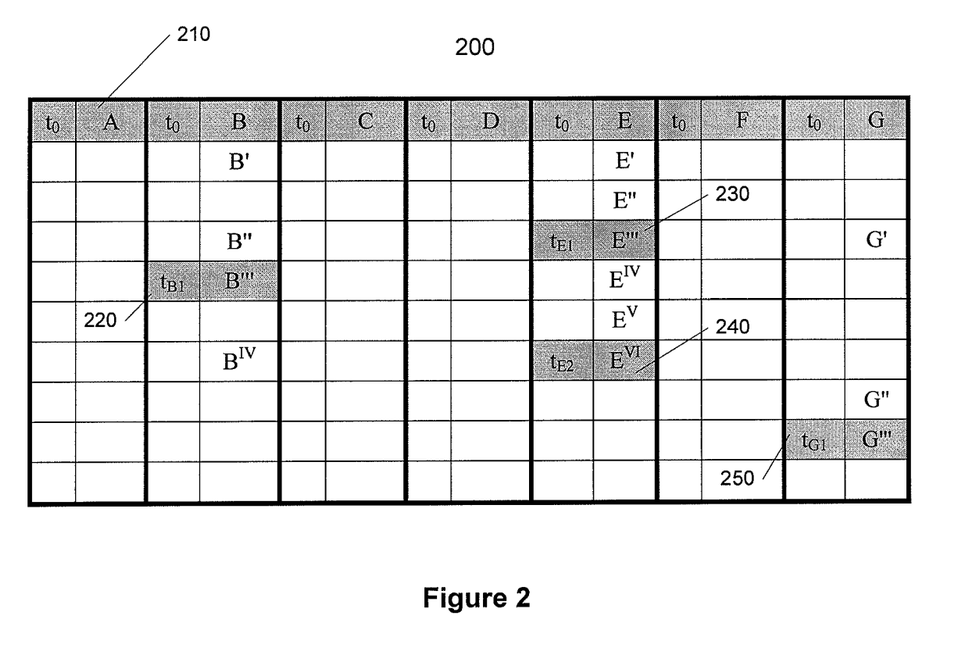
FIG. 2 illustrates an implementation of temporal data storage using an N-change granularity policy.

FIG. 2 illustrates an example of a implementation of an N-change granularity policy 200. At time $t_0$ (210), data blocks A-G are recorded and associated with time stamp $t_0$. This initial state of the data can be considered as checkpoint $CP_0$. Moving down in the table 200 is reflective of real time passing. As time passes, data blocks in the temporal volume can be modified by users or applications. For example, data block B is changed to B' and subsequently to B", and then to B'". At this point, data block B has undergone three modifications, with each modification overwriting the previous data in the block. If an N-change granularity policy for the volume is to retain modifications to a block after three changes, then a checkpoint $CP_1$ (220) is recorded for B'" and B'" is retained along with a time stamp $t_{B1}$ reflective of the time of recordation of B'". A subsequent change, $B^{IV}$ can be recorded but will be overwritten by future writes until the requisite number of changes to block B occurs. Another example is illustrated with respect to block E, wherein E'" is recorded at checkpoint $CP_1$ (230) and associated with time stamp $t_{E1}$ and $E^{VI}$ is recorded at checkpoint $CP_2$ (240) and associated with time stamp $t_{E2}$. Similarly, a series of changes to block G are illustrated wherein at G'" is retained at checkpoint $CP_1$ (250) and associated with time stamp $t_{G1}$. In N-change granularity, the decision to record a checkpoint is not tied to an actual time of change as in periodic granularity, but rather is linked to the number of changes to a data block over time. Thus, a checkpoint $CP_1$ can occur at differing real times for each block of data, as illustrated (e.g., $t_{B1}$, $t_{E1}$, and $t_{G1}$).

A similar granularity policy is fixed-change granularity, where changes to a volume are checkpointed and retained when a set amount of data has changed on the volume. For example, if a granularity attribute is sent to ten megabytes, then when ten megabytes of data change on the volume, all modified blocks since the previous checkpoint are associated with a new checkpoint and are retained with an associated time stamp. Unlike with a N-change granularity, the checkpoint associated with each block occurs at the same real time (even though the criteria for checkpointing data is divorced from real time), but the number of changes associated with each individual block of data can differ from block to block within a checkpoint and from checkpoint to checkpoint.

In an application-controlled checkpointing policy, changed data is checkpointed only when an application asks the temporal volume to checkpoint a block of data, a file, a region of data, or the entire volume of data. In application-controlled checkpointing, an application issues an I/O request that specifies a new checkpoint should be created and provides a time stamp to be associated with that checkpoint.

One drawback related to temporal granularity policies is that as time progresses, and therefore the number of stored checkpoints increases, more and more data history accumulates on the volume. For example, if a temporal volume is configured with a periodic granularity policy to checkpoint every second, then volume history accumulates on a per second basis. Maintaining this ever-increasing quantity of data can be costly in terms of resources as additional storage space may need to be dedicated to the temporal volume. Further, older data on a temporal volume can become of less importance as time passes. What is therefore desired is a mechanism to set and enforce a policy decreasing the number of checkpoints for older data, thereby effectively compressing the history, or time axis, of the data on a temporal volume. Such history compression decreases the storage resource requirements for a temporal volume operating over a prolonged period of time.

SUMMARY OF THE INVENTION

The present invention provides a method, apparatus, and computer program product for setting and implementing a policy to compress the history of data on a temporal volume. Such a capacity is provided by selecting a range of checkpoints to be compressed into a single checkpoint, recording modifications for blocks of data on the temporal volume throughout the range of checkpoints while retaining only the latest changes in the checkpoint range for each block, and associating a checkpoint corresponding to the end of the range with the retained blocks. The previously recorded data and the associated time stamps in the range can be deleted from the temporal volume, thus freeing up memory space on the temporal volume. This has the effect of increasing the granularity of temporal data.

In one embodiment of the present invention, a method, apparatus, or computer program product for selecting data blocks, determining which data block contains more recent data, and retaining that more recent data is described. First and second data blocks recorded at first and second checkpoints, respectively, in a data storage volume are selected. It is determined which of the first and second data blocks contains more recent data, and the more recent data is retained.

In one aspect of the above embodiment, retaining the more recent data involves inserting the more recent data into a union of blocks, wherein the insertion overwrites any existing data in the corresponding area in the union of blocks. In another aspect of the above embodiment, retaining the more recent data involves inserting the more recent data in a corresponding block associated with a third checkpoint on the data storage volume. In another aspect of the above embodiment, retaining the more recent data involves inserting the more recent data into the second data block.

In further aspects of the above embodiment, determining which of the first and second data blocks contains more recent data involves one of comparing a first time stamp with a second time stamp, comparing a time of recordation of the first checkpoint with that of the second checkpoint, and determining which of the first and second checkpoints was recorded later in time.

In another embodiment of the present invention, a method for decreasing the number of data checkpoints in a data storage volume by following a policy is described. The policy includes a range of checkpoints over which to decrease the number of checkpoints and a number of checkpoints within the range to be compressed to a single checkpoint. Such a policy can be defined by a user of the volume.

In one aspect of the above embodiment, the policy can include a second range of checkpoints over which to decrease the number of checkpoints and a second number of checkpoints within the second range to compress into a single checkpoint. In a another aspect of the above embodiment, compressing a number of checkpoints into one checkpoint can involve selecting a checkpoint, determining whether a block of data recorded at that checkpoint is more recent than a corresponding block in a union of blocks and, if so, retaining the more recent data, and deleting the block recorded at the checkpoint. In further aspect of the above embodiment, compressing a number of checkpoints into a single checkpoint can additionally involve creating a compression checkpoint and writing each block in the union of blocks to a corresponding block associated with the compression checkpoint.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

The present invention provides a means for compressing the stored history of selected data on a temporal volume such that data checkpoints prior to a selected checkpoint are tracked at a coarser granularity. In one embodiment of the invention, history compression can be accomplished by defining a range of checkpoints to be compressed into a single checkpoint based on the desired new granularity. If there are multiple recorded changes to selected data within the range, the latest version of the data is retained and other versions of the data are deleted. Such a method permits reclamation of storage space in the temporal volume, while maintaining temporal data retention.

A user of the temporal volume can configure policies in which changes to data can be stored using different granularities dependent upon location on the time axis. For example, in a periodic granularity temporal volume, data modifications can be stored on a per second basis over the course of the most recent day, then stored at a per minute basis for changes older than a day, and stored on a per hour basis for changes older than a week, etc.

Figure 3A:
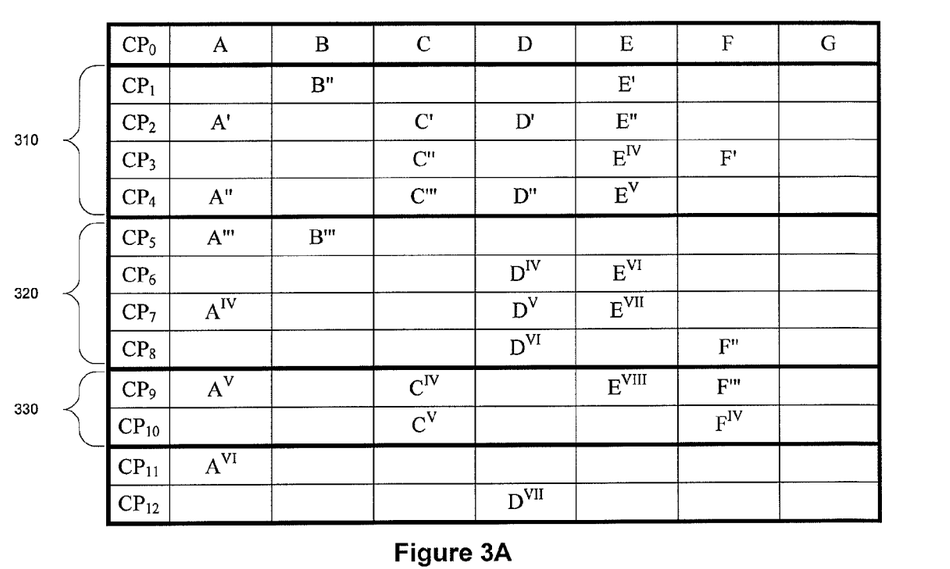
FIGS. 3A and 3B illustrate results of data compression as performed by one embodiment of the present invention.
Figure 3B:
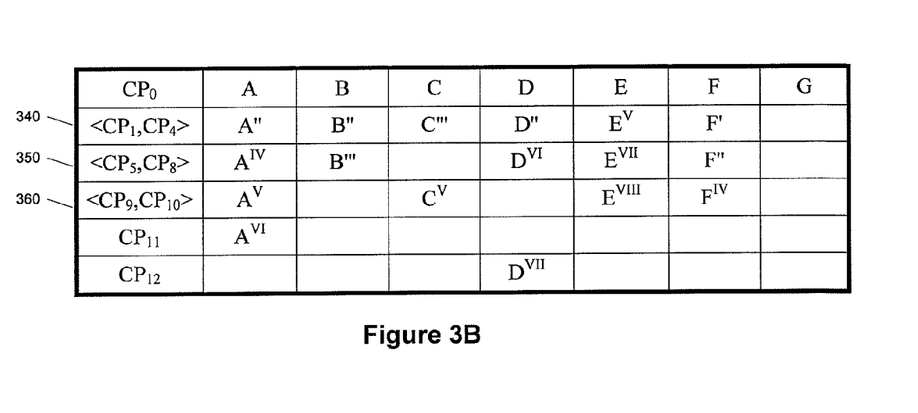

FIGS. 3A and 3B present an example of the results of data compression as carried out by an embodiment of the present invention. FIG. 3A illustrates data blocks A-G throughout a series of checkpoints $CP_0$-$CP_{12}$ stored on a periodic granularity temporal volume. At $CP_0$, the initial state of data is recorded and associated with a time $t_0$. As time progresses, data blocks are modified and checkpoints are associated with those modifications according to the temporal granularity attribute. For example, data block B has stored B" at $CP_1$ and a B''' at $CP_5$. If the density of recorded data prior to $CP_8$ is too high, a user of the temporal data can set a policy wherein data in checkpoint ranges 310 and 320 is compressed to a single checkpoint representing each of those ranges. The ranges selected for compression in 310 and 320 equal four consecutive checkpoints. A user can also set a policy where more recent checkpoints can also be compressed but at a higher density level such as that shown in range 330, wherein two consecutive time stamps are compressed to a single checkpoint; thus maintaining more recent data at more frequent checkpoints.

FIG. 3B illustrates the result of compressing the checkpoint ranges illustrated in FIG. 3A. Checkpoint $<CP_1,CP_4>$ (340) includes the compressed data from range 310. As illustrated, the last modification for each block in range 310 is retained and associated with checkpoint $<CP_1,CP_4>$. Similarly, retention of the last modification in ranges 320 and 330 is reflected at checkpoints $<CP_5,CP_8>$ and $<CP_9,CP_{10}>$, respectively.

Checkpoints $<CP_1,CP_4>$, $<CP_5,CP_8>$ and $<CP_9,CP_{10}>$ are checkpoints that take the place of the respective range of checkpoints compressed. These checkpoints can be new index points inserted into the temporal volume or can be written on top of an existing checkpoint in the range being replaced.

Through the checkpoint compression illustrated, the amount of retained data is reduced. It will be appreciated that the actual reduction in the amount of data stored will vary dependent upon the temporal granularity attribute along with the frequency of change in the selected data and the distribution of changes across blocks. Choice of temporal granularity attribute can determine whether each modification for a data block is reflected at a checkpoint. For example, FIG. 3A is representative of temporal data storage exhibited in periodic checkpointing. However, for fixed-change granularity, each checkpoint will have a record of modified data since checkpoints are generated only upon a fixed quantity of modifications to the data. Further, the data modification frequency affects the amount of data stored in all forms of temporal granularity. The more data that is stored within each range of checkpoints, then the more benefit one can realize by temporally compressing the data. A user can set a checkpoint compression policy based upon several factors, including, for example, a trade off between reclaiming data freed up by compressing the number of checkpoints and a need to be able to reference data at a fine gradient of time. Necessarily, the more space reclaimed, then the coarser the gradient of time stored and accessible on the temporal volume.

Figure 4:
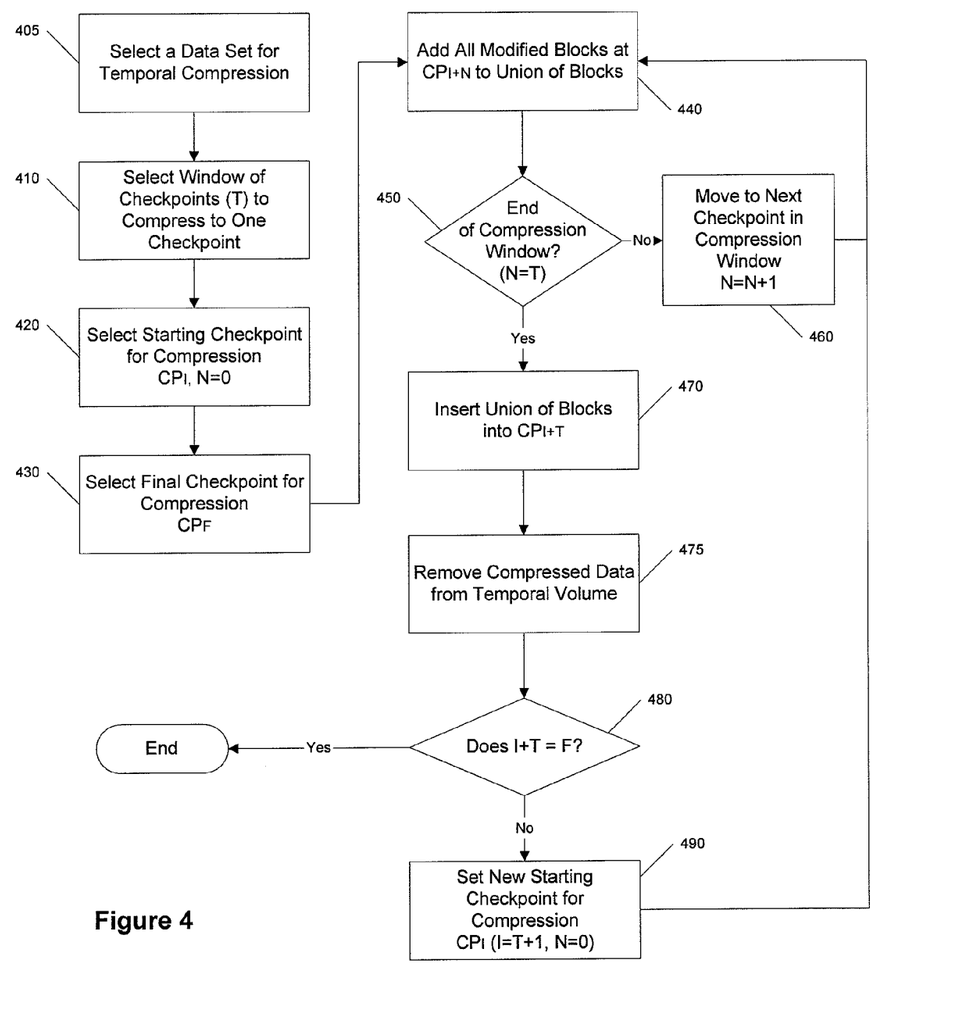
FIG. 4 is a flow diagram illustrating a method for temporal compression in accord with one embodiment of the present invention.

FIG. 4 is a flow diagram illustrating one embodiment of a method for temporal compression in accord with the present invention. Initially, a user decides a policy for temporal compression that can take into account factors mentioned above. In setting a policy for temporal compression, a user or application can select data stored on a temporal volume for which the user or application wishes to have checkpoint compression (405). Such a selection can be data blocks, a file, a set of files, a database, a directory, or an entire volume.

The user or application can select a checkpoint compression window T (410), which is a range of T checkpoints that will be condensed into a single checkpoint. The user or application can then select a range of checkpoints through which the compression window will be applied. The initial checkpoint in the checkpoint range is $CP_I$ (420). The final checkpoint in the checkpoint range is $CP_F$ (430).

The compression window will cycle through the checkpoint range. Starting at the initial checkpoint $CP_{I+N}$ (N=0), all blocks that have been modified and recorded at the checkpoint are added to a union of blocks (440). A union of blocks is a linear set of blocks representing the data set being compressed. As the selected data for checkpoint compression is scanned at each checkpoint, each modified data block is inserted into a corresponding block in the union of blocks. As each checkpoint is traversed in the compression window, if a block recorded at the checkpoint corresponds to a block in the union of blocks having data (that is, the data block represents a subsequent modification to the data stored at that block), then the block in the union of blocks is overwritten with the new data. In this manner, the union of blocks always contains the last modification to data blocks in the compression window as of the last checkpoint scanned. After each unit of data in the data set selected to be compressed has been reviewed for modification at $CP_0$, data at the next checkpoint in the compression window is examined. Cycling to the next checkpoint can be accomplished, for example, by determining whether N=T (i.e., the system has cycled to the end of the compression window) (450) and, if not, then setting N=N+1 (460) and continuing to the next checkpoint.

Once the final checkpoint in the compression window is examined, data in the union of blocks can be inserted at a checkpoint on the temporal volume. FIG. 4 illustrates that the union of blocks can be inserted at the final checkpoint within the range being compressed and thereby replacing the data at the final checkpoint, if any (470). In an alternative embodiment, data in the union of blocks can be inserted into a checkpoint either already existing or now created immediately following the compression range window (i.e., $CP_{I+T+1}$), after writing any data modified at $CP_{I+T+1}$ into the union of blocks. Alternatively, a new checkpoint can be created at an index point corresponding to those checkpoints being compressed, which will take the place of those checkpoints being compressed. Once the data in the union of blocks has been recorded at the checkpoint, the data at the checkpoints that have been compressed can be removed from the temporal volume.

The compression system can continue to work through the checkpoint range by shifting the compression window to the next set of checkpoints, provided that the end of the checkpoint range has not been reached (480). A new starting checkpoint for the compression window, $CP_{I+N}$, can be set where I=T+1 and N=0 (490). In the alternative embodiment described above, the new starting checkpoint for the compression window will be set where I=T+2.

The above-described method of working through a compression window from oldest checkpoint to most recent checkpoint is one example of scanning checkpoints during temporal compression. An alternative embodiment can involve working through the compression window from most recent checkpoint to the oldest checkpoint. For each block containing data at a checkpoint, a check can be made to determine whether a corresponding block in the union of blocks already contains data. If there is no data in the corresponding block, then the data for that block recorded at the checkpoint is entered into the union of blocks. This corresponds to the most recent modification to that data block. If there is data already present in the corresponding block in the union of blocks, then the data recorded at that block at the checkpoint is ignored. That is, the union of blocks will only contain the most recent modification. This process continues for each checkpoint in the compression window to the oldest checkpoint. The union of blocks will then contain the most recent data for each block during the compression window. The union of blocks can be stored as discussed in the above example. To make this process more efficient, blocks with data stored in the union of blocks can be blocked from review at subsequent checkpoints in the compression window, thereby only spending time reviewing blocks for which no more recent modifications have been encountered. These methods of cycling through checkpoints to determine the most recent modification to a selected set of data are meant only as examples and are not intended to be limiting as to the scope of the invention.

Figure 5:
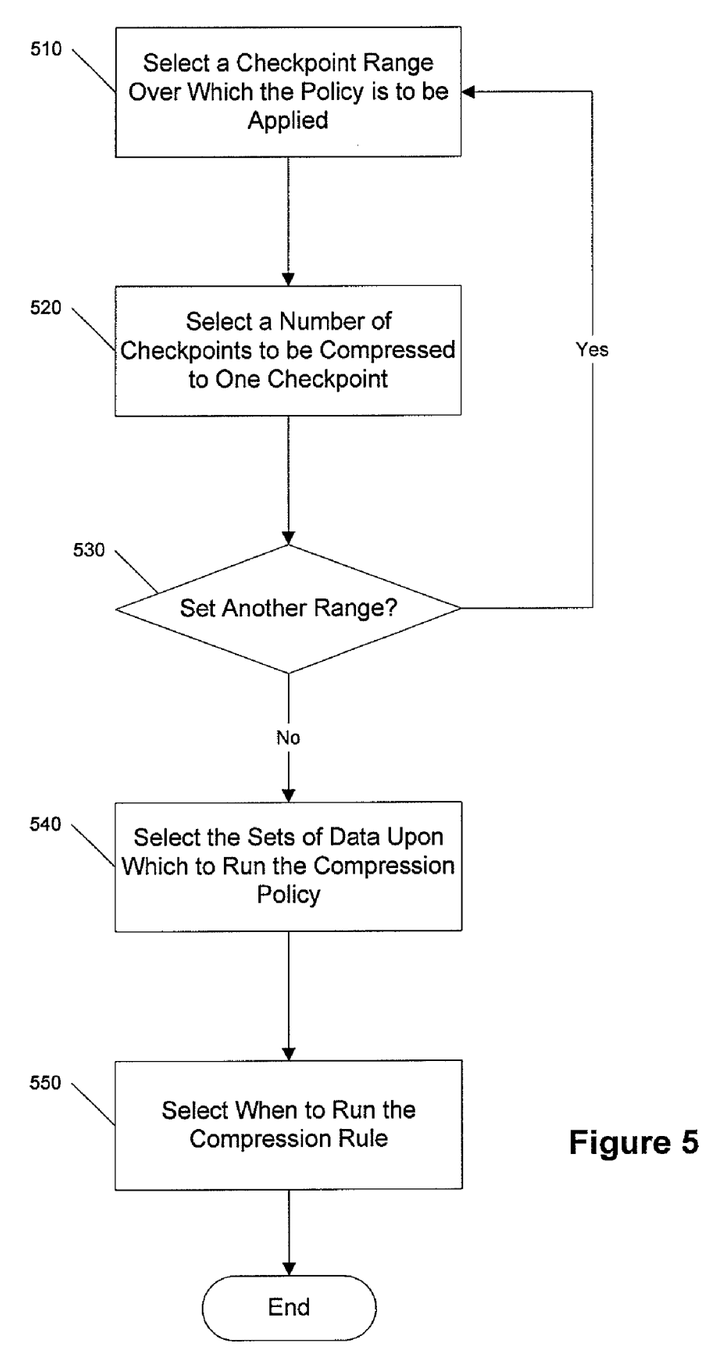
FIG. 5 is a flow diagram illustrating a method for setting a temporal compression policy in accord with one embodiment of the present invention.

FIG. 5 is a flow diagram for setting a temporal compression policy according to one embodiment of the present invention. A user can configure temporal compression of data on a temporal volume by setting a policy that defines the data set and the times over which compression should occur. Further, a policy can also define the number of checkpoints that will be compressed into a single checkpoint (i.e, the compression window discussed above). In FIG. 5, a range of checkpoints over which the policy is to be applied is defined (510). In FIG. 4, for example, the checkpoint range is selected by choosing a starting checkpoint and a final checkpoint. A compression window can be defined, which is a number of checkpoints within the checkpoint range to be compressed to one checkpoint (520). The temporal compression policy can include another temporal range within which a different compression window setting can be applied (530). A user can also select sets of data upon which to run the temporal compression policy (540). As stated above, definition of data sets is flexible. A user can also define when to run the compression rule (550), either immediately, at a specified time, or at regular interval. Alternatively, a user can specify ranges for compression based upon real time (i.e., time stamps) rather than checkpoints. A temporal volume manager can then determine those checkpoints closest to the times specified and translate the real times into checkpoints for compression.

Once data on a temporal volume has been temporally compressed, temporal compression can be run on the same temporal range to achieve coarser levels of temporal granularity.

Temporal volumes use a variety of methods to track and store modified blocks of data. In certain embodiments, for example, a modified block at a particular checkpoint is linked to a corresponding block modified at an earlier checkpoint. During the course of temporal compression, links between blocks at the compressed checkpoints can require forming or repair. Further, metadata referencing modified data blocks may require modification to reflect the removed blocks as well as to reflect the newly inserted blocks at the compressed checkpoint.

An Example Computing and Network Environment

As shown above, the present invention can be implemented using a variety of computer systems and networks. An example of one such computing and network environment is described below with reference to FIGS. 6 and 7.

Figure 6:
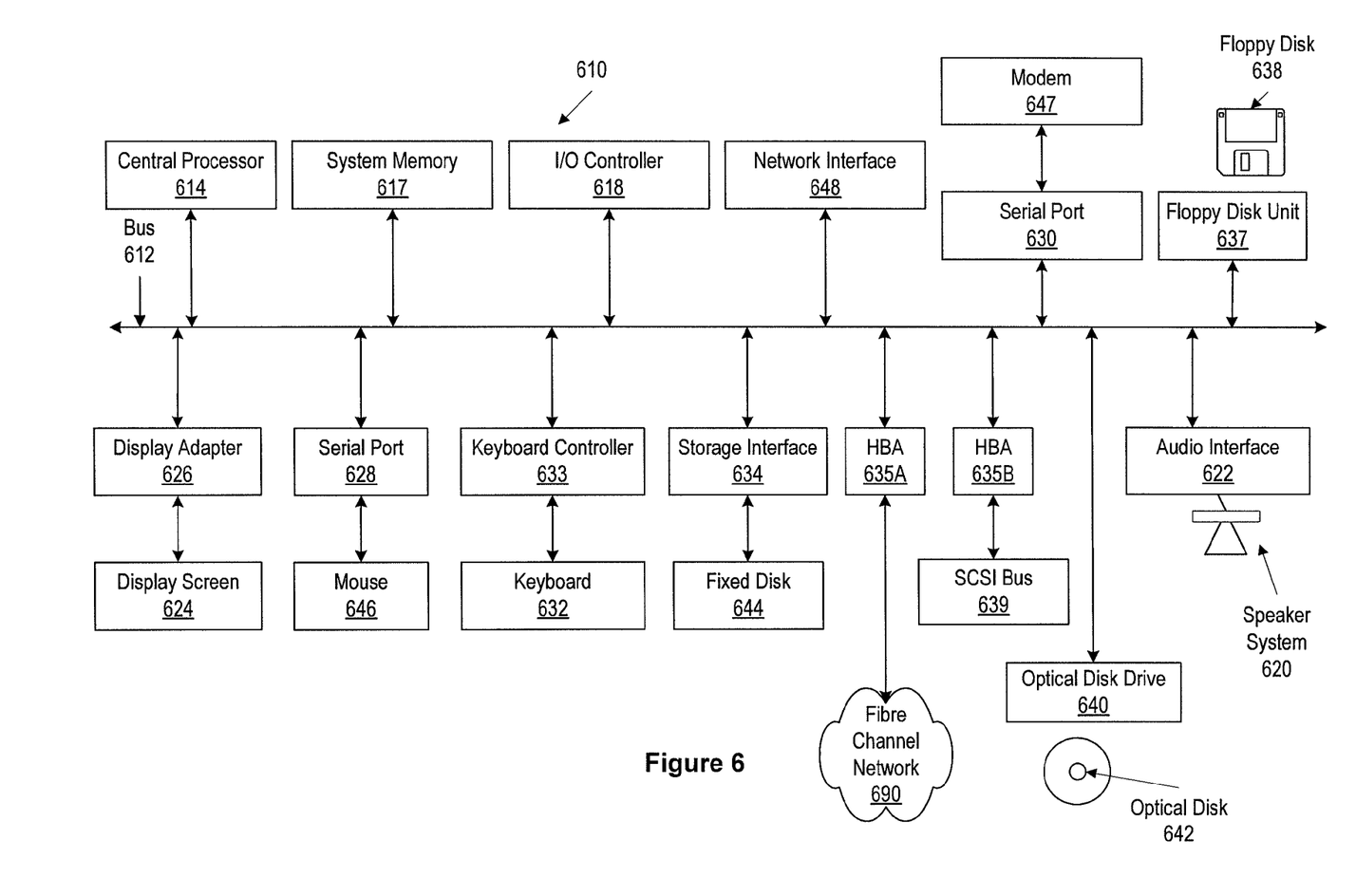
FIG. 6 depicts a block diagram of a computer system suitable for implementing the present invention.

FIG. 6 depicts a block diagram of a computer system 610 suitable for implementing the present invention. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a fibre channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 610 are generally stored on and accessed via a computer readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, all of the devices shown in FIG. 6 need not be present to practice the present invention. The devices and subsystems can be interconnected in different ways from that shown in FIG. 6. The operation of a computer system such as that shown in FIG. 6 is readily known in the art and is not discussed in detail in this application. Code to implement the present invention can be stored in computer-readable storage media such as one or more of system memory 617, fixed disk 644, optical disk 642, or floppy disk 638. Additionally, computer system 610 can be any kind of computing device, and so includes personal data assistants (PDAs), network appliance, X-window terminal or other such computing devices. The operating system provided on computer system 610 may be MS-DOS®, MS-WINDOWS®, OS/2®, UNIX®, Linux®, or another known operating system. Computer system 610 also supports a number of Internet access tools, including, for example, an HTTP-compliant web browser having a JavaScript interpreter, such as Netscape Navigator®, Microsoft Internet Explorer®, and the like.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
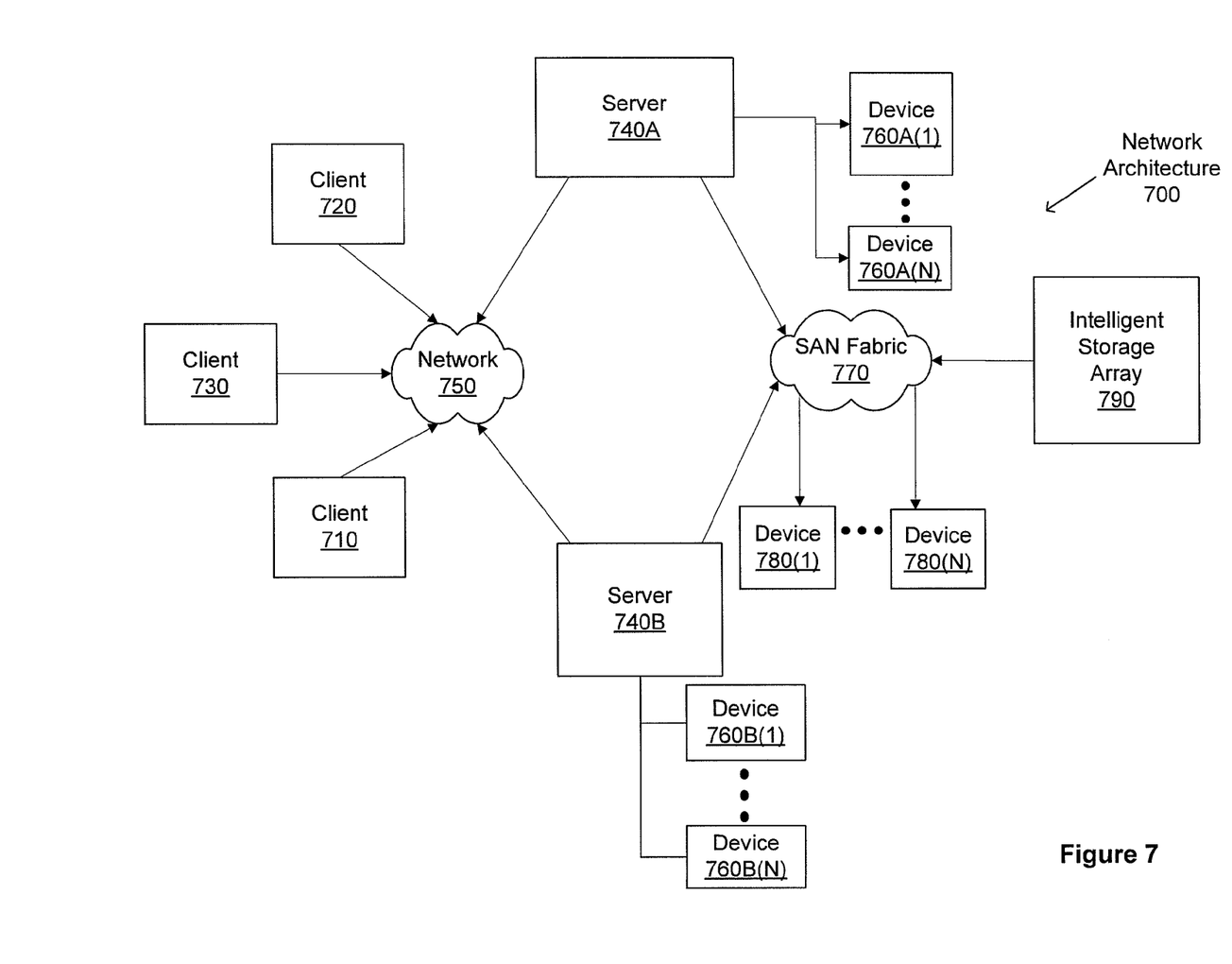
FIG. 7 is a block diagram depicting a network architecture suitable for implementing the present invention.

FIG. 7 is a block diagram depicting a network architecture 700 in which client systems 710, 720 and 730, as well as storage servers 740A and 740B (any of which can be implemented using computer system 610), are coupled to a network 750. Storage server 740A is further depicted as having storage devices 760A(1)-(N) directly attached, and storage server 740B is depicted with storage devices 760B(1)-(N) directly attached. Storage servers 740A and 740B are also connected to a SAN fabric 770, although connection to a storage area network is not required for operation of the invention. SAN fabric 770 supports access to storage devices 780(1)-(N) by storage servers 740A and 740B, and so by client systems 710, 720 and 730 via network 750. Intelligent storage array 790 is also shown as an example of a specific storage device accessible via SAN fabric 770.

With reference to computer system 610, modem 647, network interface 648 or some other method can be used to provide connectivity from each of client computer systems 710, 720 and 730 to network 750. Client systems 710, 720 and 730 are able to access information on storage server 740A or 740B using, for example, a web browser or other client software (not shown). Such a client allows client systems 710, 720 and 730 to access data hosted by storage server 740A or 740B or one of storage devices 760A(1)-(N), 760B(1) (N), 780(1)-(N) or intelligent storage array 790. FIG. 7 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 610). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
   selecting a range of checkpoints recorded in a temporal volume to compress to a single checkpoint, wherein
      the temporal volume comprises a data storage volume maintaining a history of data stored on the data storage volume by associating historical data with checkpoints;
   selecting a set of data blocks recorded in the temporal volume to subject to said compression;
   for each block in the set of data blocks,
      determining the most recent data recorded in the range of checkpoints, and recording the most recent data in a corresponding block of a union of data blocks; and
   upon recording the most recent data for each block over the range of checkpoints in the union of data blocks,
      deleting the set of data blocks at each checkpoint in the range of checkpoints, and
      recording the union of data blocks at a checkpoint in the temporal volume.

2. The method of claim 1 wherein said determining the most recent data recorded in the range of checkpoints comprises:
   selecting checkpoints in reverse chronological order in the range of checkpoints; and
   for each checkpoint and for each block containing data recorded at the checkpoint,
      selecting the data recorded in the data block at the checkpoint for recording in the corresponding block of the union of data blocks, if the corresponding block of the union of data blocks does not contain previously recorded data, and
      disregarding the data recorded in the data block at the checkpoint, if the corresponding block of the union of data blocks contains previously recorded data.

3. The method of claim 2 wherein said recording the most recent data in the corresponding block of the union of data blocks comprises:

recording the selected data recorded in the data block at the checkpoint in the corresponding block of the union of data blocks.

4. The method of claim 2 wherein said determining the most recent data recorded in the range of checkpoints further comprises:
for each checkpoint, checking only those data blocks for data recorded at the checkpoint that have no data previously recorded in the corresponding block of the union of data blocks.

5. The method of claim 1 wherein said determining the most recent data recorded in the range of checkpoints comprises:
selecting checkpoints in chronological order in the range of checkpoints; and
for each checkpoint and for each block containing data recorded at the checkpoint, selecting the data recorded in the data block at the checkpoint for recording in the corresponding block of the union of data blocks.

6. The method of claim 5 wherein said recording the most recent data in the corresponding block of the union of data blocks comprises recording the selected data recorded in the data block at the checkpoint in the corresponding block of the union of data blocks.

7. The method of claim 1 wherein said selecting the range of checkpoints comprises:
selecting a starting checkpoint of the range of checkpoints; and
selecting a number of checkpoints to compress to the single checkpoint.

8. The method of claim 7 further comprising:
selecting a first range of checkpoints to subject to checkpoint compression;
selecting the first checkpoint of the first range of checkpoints as the starting checkpoint of the range of checkpoints; and
upon recording the union of data blocks at the checkpoint, selecting a next checkpoint of the first range of checkpoints as a next starting checkpoint of the range of checkpoints.

9. The method of claim 8 further comprising:
performing compression of the range of checkpoints until a last checkpoint of the first range of checkpoints is reached.

10. A system comprising:
a temporal volume, wherein
the temporal volume comprises a data storage volume storing data and a history of the stored data, and
the history of the stored data is maintained by associating historical data with checkpoints;
a processor, coupled to the temporal volume, and configured to
select a range of checkpoints recorded in the temporal volume to compress to a single checkpoint, and
select a set of data blocks recorded in the temporal volume to subject to said compression;
for each block in the set of data blocks, the processor is further configured to
determine the most recent data recorded in the range of checkpoints, and
record the most recent data in a corresponding block of a union of data blocks; and
upon recording the most recent data for each block over the range of checkpoints in the union of data blocks, the processor is further configured to
delete the set of data blocks at each checkpoint in the range of checkpoints, and
record the union of data blocks at a checkpoint in the temporal volume.

11. The system of claim 10 wherein in order to determine the most recent data recorded in the range of checkpoints the processor is further configured to:
select checkpoints in reverse chronological order in the range of checkpoints; and
for each checkpoint and for each block containing data recorded at the checkpoint,
select the data recorded in the data block at the checkpoint for recording in the corresponding block of the union of data blocks, if the corresponding block of the union of data blocks does not contain previously recorded data, and
disregard the data recorded in the data block at the checkpoint, if the corresponding block of the union of data blocks contains previously recorded data.

12. The system of claim 11 wherein in order to record the most recent data in the corresponding block of the union of data blocks the processor is further configured to:
record the selected data recorded in the data block at the checkpoint in the corresponding block of the union of data blocks.

13. The system of claim 11 wherein in order to determine the most recent data recorded in the range of checkpoints the processor is further configured to:
for each checkpoint, check only those data blocks for data recorded at the checkpoint that have no data previously recorded in the corresponding block of the union of data blocks.

14. The system of claim 10 wherein in order to determine the most recent data recorded in the range of checkpoints the processor is further configured to:
select checkpoints in chronological order in the range of checkpoints; and
for each checkpoint and for each block containing data recorded at the checkpoint, select the data recorded in the data block at the checkpoint for recording in the corresponding block of the union of data blocks.

15. The system of claim 10 wherein in order to select the range of checkpoints the processor is further configured to:
select a starting checkpoint of the range of checkpoints; and
select a number of checkpoints to compress to the single checkpoint.

16. The system of claim 15 wherein the processor is further configured to:
select a first range of checkpoints to subject to checkpoint compression;
select the first checkpoint of the first range of checkpoints as the starting checkpoint of the range of checkpoints; and
upon recording the union of data blocks at the checkpoint, select a next checkpoint of the first range of checkpoints as a next starting checkpoint of the range of checkpoints.

17. The system of claim 16 wherein the processor is further configured to:
perform compression of the range of checkpoints until a last checkpoint of the first range of checkpoints is reached.

18. A computer-readable storage medium storing instructions executable by a processor, the instructions comprising:
a first set of instructions configured to select a range of checkpoints recorded in a temporal volume to compress to a single checkpoint, wherein the temporal volume comprises a data storage volume maintaining a history of data stored on the data storage volume by associating historical data with checkpoints, and the temporal volume is coupled to the processor;

a second set of instructions configured to select a set of data blocks recorded in the temporal volume to subject to said compression;

a third set of instructions configured to, for each block in the set of data blocks, determine the most recent data recorded in the range of checkpoints, and record the most recent data in a corresponding block of a union of data blocks; and a fourth set of instructions configured to, upon recording the most recent data for each block over the range of checkpoints in the union of data blocks, delete the set of data blocks at each checkpoint in the range of checkpoints, and record the union of data blocks at a checkpoint in the temporal volume.

19. The computer-readable storage medium of claim 18 wherein the third set of instructions configured to determine the most recent data recorded in the range of checkpoints further comprises:

a fifth set of instructions configured to select checkpoints in reverse chronological order in the range of checkpoints; and a sixth set of instructions configured to, for each checkpoint and for each block containing data recorded at the checkpoint, select the data recorded in the data block at the checkpoint for recording in the corresponding block of the union of data blocks, if the corresponding block of the union of data blocks does not contain previously recorded data, and disregard the data recorded in the data block at the checkpoint, if the corresponding block of the union of data blocks contains previously recorded data.

20. The computer-readable storage medium of claim 18 wherein the third set of instructions configured to determine the most recent data recorded in the range of checkpoints further comprises:

a fifth set of instructions configured to select checkpoints in chronological order in the range of checkpoints; and a sixth set of instructions configured to, for each checkpoint and for each block containing data recorded at the checkpoint, select the data recorded in the data block at the checkpoint for recording in the corresponding block of the union of data blocks.

* * * * *